(12) United States Patent
Stauss

(10) Patent No.: US 8,444,342 B2
(45) Date of Patent: May 21, 2013

(54) TENSILE/TILTING CONNECTOR SYSTEM

(76) Inventor: Ulrich Stauss, Rottweil (DE)

( * ) Notice: Subject to any disclaimer, the term of this patent is extended or adjusted under 35 U.S.C. 154(b) by 298 days.

(21) Appl. No.: 12/522,842

(22) PCT Filed: Dec. 21, 2007

(86) PCT No.: PCT/EP2007/011340
§ 371 (c)(1),
(2), (4) Date: Jul. 10, 2009

(87) PCT Pub. No.: WO2008/083832
PCT Pub. Date: Jul. 17, 2008

(65) Prior Publication Data
US 2010/0003073 A1    Jan. 7, 2010

(30) Foreign Application Priority Data

Jan. 10, 2007  (DE) .................... 20 2007 000 370 U

(51) Int. Cl.
*F16D 1/00*        (2006.01)

(52) U.S. Cl.
USPC .......................................... 403/255; 403/231

(58) Field of Classification Search
USPC ................. 403/230, 231, 252–255, 257, 258, 403/264, 381, 387
See application file for complete search history.

(56) References Cited

U.S. PATENT DOCUMENTS

| | | | | |
|---|---|---|---|---|
| 5,171,098 A | * | 12/1992 | Jost | 403/252 |
| 5,173,001 A | * | 12/1992 | Schunke | 403/252 |
| 5,722,948 A | | 3/1998 | Gross | |
| 6,382,866 B1 | * | 5/2002 | Zihlmann | 403/255 |
| 6,582,149 B1 | * | 6/2003 | Holscher | 403/255 |
| 7,004,667 B2 | | 2/2006 | Ludwig et al. | |

(Continued)

FOREIGN PATENT DOCUMENTS

| | | |
|---|---|---|
| DE | 3829306 | 3/1990 |
| DE | 9013802 | 12/1990 |

(Continued)

OTHER PUBLICATIONS

Bickford, John H., "Handbook of Bolts and Bolted Joints", 1998, Marcel Dekker, Inc., p. 133.*

(Continued)

*Primary Examiner* — Joshua Kennedy
(74) *Attorney, Agent, or Firm* — Bachman & LaPointe, P.C.

(57) ABSTRACT

A connector system (12,72) with a connector (11,61,71) of a fastening screw (17,18) and an anchor screw (19), wherein the connector (11, 61, 71) is designed for immobilization in a groove (7) of a first profile (1) which is provided with an undercut (5) formed by a profile bridge (3) and has a connector body (13, 65, 75) which has a first opening (21, 63, 31') for an anchor screw (19) and at least one second opening (23, 23', 59A, 59B) which is provided with an internal thread (41) and intended for a fastening screw (17, 18). The connector body (13, 65, 75) extends substantially flat along a connector body plane (15), and the fastening screw (17, 18) at one end has a shaft (27) carrying an external thread (25) and an integrally molded flange (28, 29) which extends radially to the outside from a screw head (31), wherein the anchor screw (19) is provided for placement in the first opening (21, 21', 63) of the connector (11, 61, 71), and at least one fastening screw (17, 18) is provided for placement in the at least one second opening (23, 59A, 59B).

22 Claims, 4 Drawing Sheets

U.S. PATENT DOCUMENTS

| | | | | |
|---|---|---|---|---|
| 7,806,622 B2 * | 10/2010 | Stauss | ............................ | 403/381 |
| 8,100,600 B2 * | 1/2012 | Blum | ............................ | 403/256 |
| 2006/0078371 A1 * | 4/2006 | Holscher | ....................... | 403/264 |
| 2008/0232897 A1 | 9/2008 | Stauss | | |

FOREIGN PATENT DOCUMENTS

| | | |
|---|---|---|
| DE | 4127284 C1 | 12/1992 |
| DE | 9313596.3 | 10/1993 |
| DE | 4244396 | 6/1994 |
| DE | 9414884 | 11/1994 |
| DE | 19925993 A1 * | 12/2000 |
| DE | 20203283 U1 | 6/2002 |
| DE | 20210133 U1 | 12/2003 |
| DE | 202004017885 | 6/2005 |
| DE | 202005013097 U1 | 12/2005 |
| DE | 202005013097 U1 * | 1/2006 |
| DE | 19825426 B4 | 3/2006 |

OTHER PUBLICATIONS

Translation of DE19925993A1 via EPO Machine Translation. Retrived Aug. 1, 2011.*

* cited by examiner

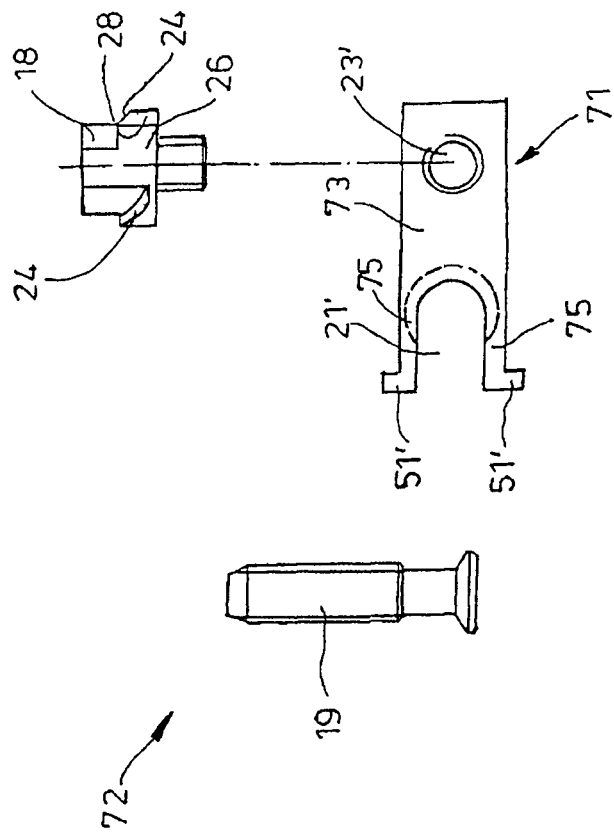
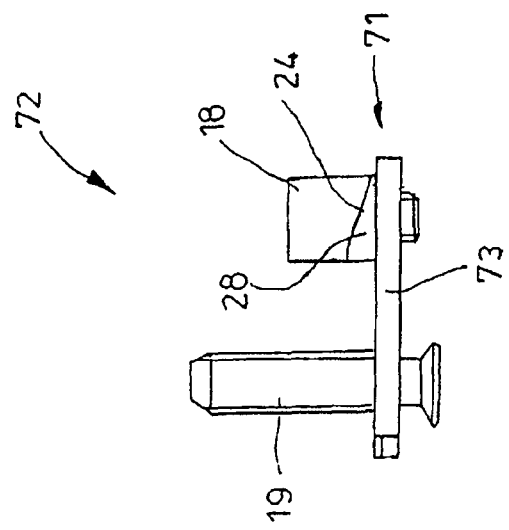
Fig. 3B
Fig. 3A

TENSILE/TILTING CONNECTOR SYSTEM

BACKGROUND OF THE INVENTION

The invention relates to a connector system with a connector, a fastening screw and an anchoring screw and to a profile assembly.

DE 198 25 426 B4 and DE 199 25 993 A1 each disclose a fastening element for a proximity switch, which fastening element can be inserted into a T groove and can be brought into a clamping position with respect to the flanks of the T groove, but is not suitable as a fastening screw for a connector system of the type mentioned at the beginning. A connector as can customarily be used in profile assemblies is disclosed in U.S. Pat. No. 6,582,149 B1. Examples of profile assemblies are described, for example, in DE 202 03 283 U1 and U.S. Pat. No. 7,004,667 B2.

A connector system in which a connector is designed as a tensile connector is disclosed in DE 4127284 C1. A corresponding profile construction made of profile rods has at least in each case one longitudinal groove which is provided with at least one undercut, with at least some of the profile rods having at least one longitudinal bore which, at least at one of the ends thereof, has a thread which is provided for engagement with an anchoring screw. By means of the anchoring screw, a connector which is penetrated by the anchoring screw and has at least one limb can be fixed on the associated first profile rod which engages in such a manner in the longitudinal groove of the second profile rod to be connected that it engages by means of a limb behind at least one undercut. The connector can be fixed on the first profile rod with predefinable play and engages in the longitudinal groove of the second profile rod with at least partial compensation for said play. A fastening screw is received in a bore, which reaches completely through the connector and has an internal thread, and is supported with its one end against an anchoring screw such that the connector is pressed by means of at least one limb against a profile web of an undercut in such a manner that, by this means, the profile rods are connected fixedly to one another via the connector. The above-mentioned connector therefore imparts a pressing pressure which the fastening screw exerts on the head of the anchoring screw.

A tilting connector is disclosed in DE 20 2005 013 097.4 U1. Said tilting connector is suitable for fixing in a groove of a first profile, which groove is provided with an undercut, and is in the form of a connector body stretched along a longitudinal extent. The connector body has: a base and a web, which protrudes from the base and extends along the longitudinal extent, for laterally fixing the tilting connector in the groove, with a base region protruding from the web forming a stop surface for engagement behind the undercut, and a first hole being provided for an anchoring screw for introduction thereof into a second profile, and a second hole being provided for a fastening screw designed as a lever screw. The stop surface has a first stop region and a second stop region which are arranged at a releasing angle with respect to each other, thus forming a tilting edge which is located between them and which is provided for the contact and formation of a lever arrangement on a rear side of the undercut.

A connector system of the type mentioned at the beginning is disclosed in German utility model G 94 14 884.8.

Both connectors according to the prior art have a substantially angular three-dimensional shaping and generally have to be formed as comparatively costly precision castings.

It would be desirable to design a connection in a manner such that it can be produced at a comparatively more advantageous cost and nevertheless to ensure a secure connection in a profile assembly.

SUMMARY OF THE INVENTION

The object of the invention is to specify a connector system with a fastening screw and a connector which can be produced at a comparatively advantageous cost and nevertheless can provide a secure connection for a profile assembly. It is a further object to specify a corresponding profile assembly. The object is achieved by a connector system with the features disclosed herein and a profile assembly also with the features disclosed herein.

In the case of the connector, the connector body extends according to the invention substantially flat along a connector body plane. The maximum thickness of the connector body preferably amounts to no more than 20% of a longitudinal extent of the connector body, i.e. the latter is a preferred, substantially flat connector body. In particular, the thickness is taken on over a substantial and in particular substantially planar region.

The invention has recognized that it is possible with the connector system according to the concept of the invention to produce the connector body at a comparatively advantageous cost in the form of a sheet-metal part and/or a punched part and/or a bent part. The substantial advantage is that a comparatively costly production of a connector body by precision casting can be omitted.

According to the invention, a flange which extends radially outward from a screw head is integrally formed on the fastening screw.

The invention has recognized that it is possible with a fastening screw designed in such a manner to support the flange on the undercut of the groove, which is formed by the profile web. When the fastening screw is tightened, the effect achieved owing to the external thread of the stem, which external thread is in engagement with the internal thread of the second opening of the connector body, is that the above-mentioned supporting effect is obtained on the flange bearing on that side of the undercut which faces the interior of the groove, and therefore the connector is moved further with respect to the interior of the groove in the direction of the groove base.

According to the invention, the connector system of the type mentioned at the beginning furthermore has an anchoring screw, with, according to the concept of the invention, the anchoring screw being provided for arrangement in the first opening of the connector, and at least one fastening screw being provided for arrangement in at least one second opening.

A movement of the connector guided toward the interior of the groove results in a tensile effect on the anchoring screw which is provided with a stem for fixing in a receiving opening, preferably in a central receiving opening of a second profile of a profile assembly. According to the concept of the invention, the effect thereby achieved is that the second profile, which generally stands perpendicularly on the first profile, is pulled onto the profile and, as a result, is fixed to the first profile.

Accordingly, the concept of the invention results in a profile assembly of the type mentioned at the beginning with a first profile having a groove provided with an undercut formed by a profile web, and with a second profile having a receiving opening and a connector system according to the concept of the invention. In this case, the first profile and the second profile can be of substantially identical design.

Advantageous developments of the invention can be gathered from the dependent claims and specify in detail advantageous possibilities of realizing the above-explained concept within the context of the object set and with regard to further advantages.

According to a particularly preferred development of the invention, the connector body has precisely one second opening provided with an internal thread and intended for a fastening screw. This is advantageously a low-weight connector body which can be formed in a particularly simple manner. With regard to the connector system, it is provided, according to this development, that precisely one fastening screw acts in the functional position as a lever screw, and the connector acts in the functional position as a tilting connector with a tilting edge on the far side of the first opening. In this development of the invention, upon rotation of the fastening screw, the connector body is pushed on the side opposite the tilting edge into the interior of the groove while the tilting edge bears against that surface of the undercut which faces the interior of the groove. It has proven particularly advantageous with regard to this development that an advantageous design of a lever arm such that it is matched to its use can be achieved by changing the length of the connector body or changing the hole spacing in the connector body. The lever effect is greater the further away the tilting edge is from the axis of the fastening screw. In practice, this enables one lever design which is suitable for any tightening torque to be provided.

The position of the fastening screw can also bring about a fixing of the perpendicular profile by the head diameter of the fastening screw and the width of the groove being matched to each other in such a manner that the head has comparatively little play in the groove. This has the advantage that the perpendicular profile is prevented from rotating, and the two profiles are arranged in a correct position with respect to each other, in particular without profile corners protruding.

According to a particularly preferred first variant of this development of the invention, the first opening for the anchoring screw is in the form of a thread-free screw hole—i.e. the hole edge completely surrounds the anchoring screw. The anchoring screw, for example additionally provided with a sleeve, can be fixed in a central receiving opening of the second profile by means of a threaded connection and can furthermore be held by means of its screw head in the first opening. As an alternative to the sleeve, the upper side of the connector body can have a collar on the first opening for the anchoring screw.

According to a second particularly preferred variant of this development, the first opening is in the form of a slot of the connector body, which slot runs in the longitudinal direction of the connector body and is delimited by fork-like arms. This has the advantage that the anchoring screw does not inevitably have to be placed into the first opening, but rather the second variant of this development makes it possible for the connector body, with the slot under a screw head of the anchoring screw, to be able to be pushed over the stem of the anchoring screw such that the head of the anchoring screw strikes behind the fork-like arms of the slot when the connector system is tightened. For this purpose, the head of the anchoring screw is preferably countersunk, in particular narrowed, toward the stem. By means of the latter measure, the slot can be pushed at a predefined position along the screw axis over the narrowing of the anchoring screw. The second variant of this development is very particularly suitable for use when placing a second profile into an existing profile assembly without profile connections which already exist having to be released, since, owing to its laterally open slot, the connector body can easily be pushed over the stem of the anchoring screw. The slot preferably has an indentation on its side facing the head of the anchoring screw. This has the advantage that the head is fixed particularly readily and at an early point to the connector body, in particular during the tightening of the fastening screw. For this purpose, the slot could also have, at its closed end, an expanded portion matched to the head of the anchoring screw.

According to a particularly preferred third variant of the invention, precisely two fastening screws are provided for arrangement in the precisely second openings, the two fastening screws each acting in the functional position as a tension screw, and the connector acting in the functional position as a tensile connector. The third variant of the invention permits particularly stable fixing of a second profile to a first profile by a respective fastening screw preferably on both sides of the central anchoring screw being tightened. As a result, the associated connector of the connector system is pushed forward at a parallel spacing from the profile web into the interior of the groove, and therefore the second profile, which stands perpendicularly on the first profile, is pulled toward the latter and fixed as a result.

Exemplary embodiments of the invention are now described below with reference to the drawing in comparison to the prior art, part of which is likewise illustrated. The drawing is not necessarily intended to illustrate the exemplary embodiments to scale; rather, the drawing is in schematized and/or slightly distorted form where this serves for explanation purposes. With regard to additions to the teaching which can be directly seen in the drawing, reference is made to the relevant prior art. In doing so, it should be taken into consideration that diverse modifications and changes relating to the shape and the detail of an embodiment can be undertaken without departing from the general concept of the invention. The features of the invention that are disclosed in the description, in the drawing and in the claims may be essential both individually and in any combination for the development of the invention. In addition, all combinations of at least two of the features disclosed in the description, the drawing and/or the claims are included in the scope of the invention. The general concept of the invention is not restricted to the exact form or the detail of the preferred embodiment shown and described below, or limited to a subject matter which would be restricted in comparison to the subject matter claimed in the claims. In the case of the stated dimensional ranges, values which lie within the above-mentioned limits are also intended to be disclosed as limit values and to be usable and claimable as desired.

BRIEF DESCRIPTION OF THE DRAWINGS

In the figures of the drawing, in detail:

FIG. 3A, FIG. 3B show a perspective illustration (3A) and exploded illustration (3B) of a connector system according to an embodiment according to the second variant of the invention, which connector system can furthermore be used—in a manner similar to that illustrated in FIG. 1, FIG. 1A, FIG.

1B—to assemble a profile assembly, but the connector system of this embodiment can also be pushed laterally over an anchoring screw.

DETAILED DESCRIPTION

Figure 1:
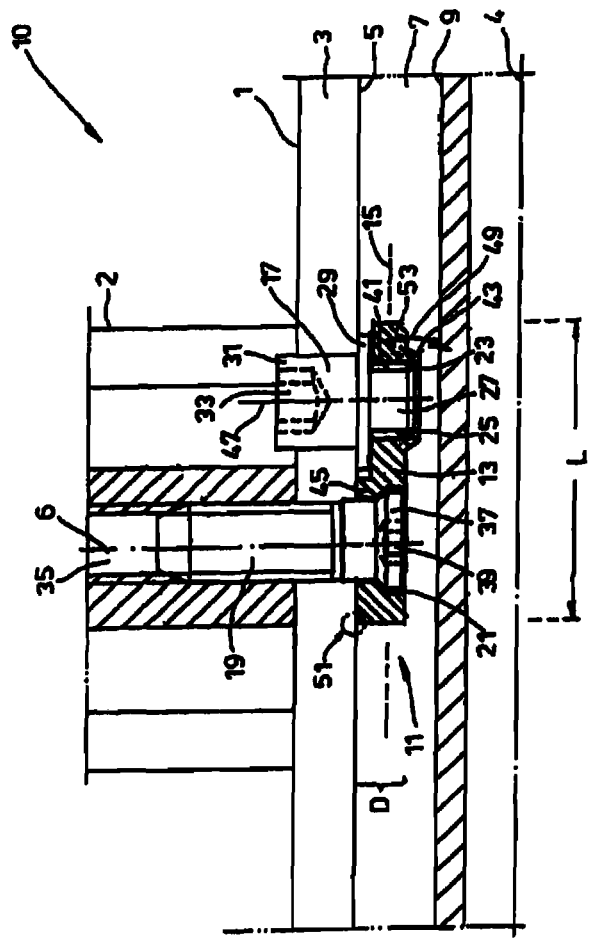
FIG. 1 shows a sectional illustration of a profile assembly with a connector system as an embodiment according to the first variant of the invention.

FIG. 1 shows a profile assembly 10 with a connector 11 in an embodiment according to the first variant of the invention. The present profile assembly 10 has a first profile 1 and a second profile 2 which are of substantially identical design. In the case of the first profile 1, the undercut 5 formed by a profile web 3 is shown, a groove 7 running between said undercut 5 and the groove base 9, said groove having a narrow point between two opposite profile webs 3 (not shown specifically) and expanding toward the groove base 9. The respective axes of symmetry of the profiles 1 and 2 are denoted by 4 and 6.

The connector 11 has a connector body 13 which extends substantially flat along a connector body plane 15 indicated by dashed lines. In the present case, the maximum thickness D of the connector body 13 amounts to no more than 20% of a longitudinal extent L of the connector body 13.

Figure 1B:
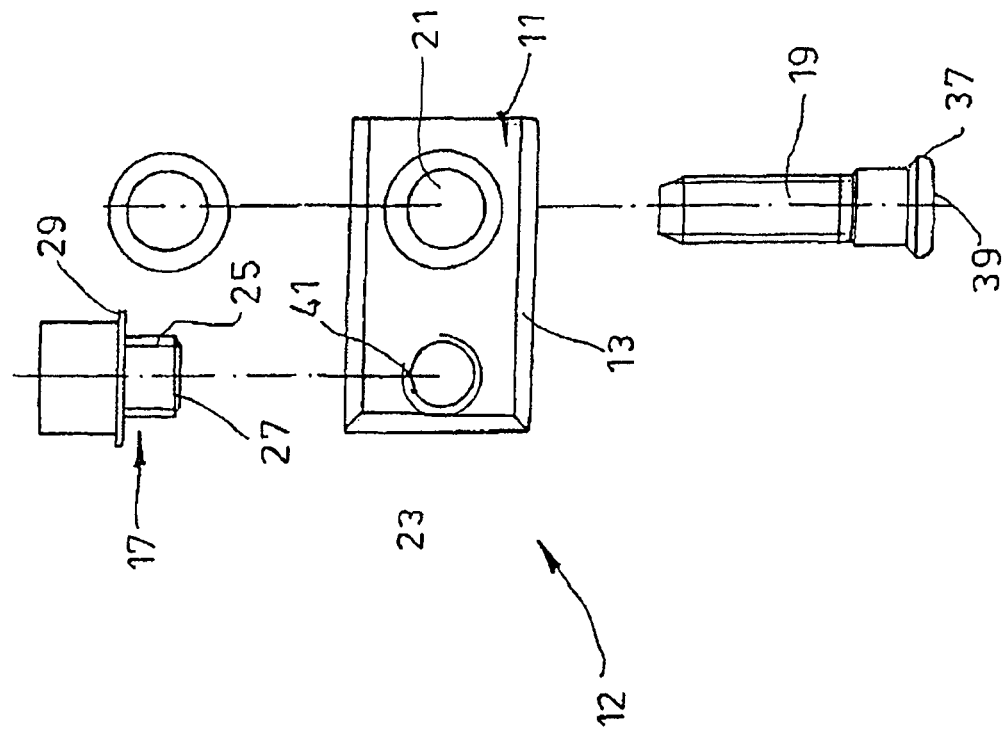
FIG. 1A, FIG. 1B show a perspective illustration (1A) and exploded illustration (1B) of the preferred embodiment of the connector system from FIG. 1.
Figure 1A:
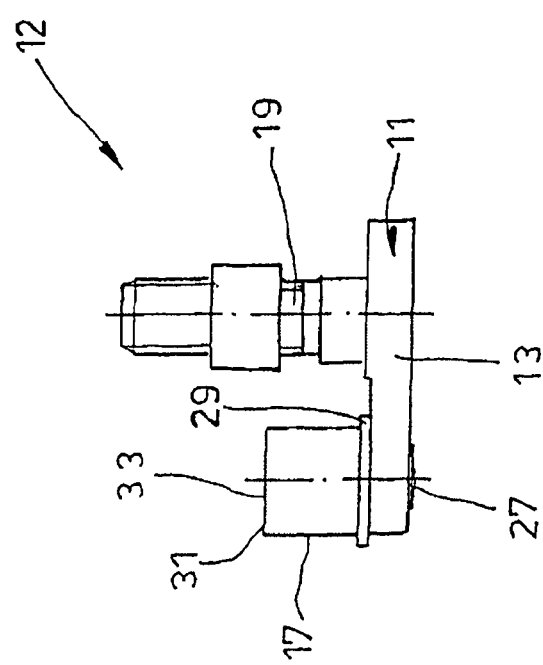

The connector system 12, which is reproduced perspectively once again in FIG. 1A and FIG. 1B and comprises a connector 11, fastening screw 17 and anchoring screw 19, provides that, as illustrated in FIG. 1, the anchoring screw 19 is provided for arrangement in the first opening 21 of the connector 11, and precisely one fastening screw 17 is provided for arrangement in the second opening 23 of the connector 11. At one end, the fastening screw 17 has a stem 27 bearing an external thread 25, and a flange 29 which extends radially outward from a screw head 31, in the present case in the form of a hexagon socket insert cup 33. As a modification, other insert cups may be realized, for example a hexalobular internal insert cup.

The anchoring screw 19 is screwed into a central receiving opening 35 of the second profile 2, which receiving opening runs along the axis 6. Said anchoring screw is held by its countersunk head 37, which in turn has a hexagon socket cup 39, in a form-fitting manner without a thread in the precisely one second opening 21 of the connector body 13. By contrast, the precisely one second opening 23 bears an internal thread 41 in which the external thread 25 of the stem 27 of the fastening screw 17 engages.

In the embodiment of a connector 11 that is illustrated in FIG. 1, FIG. 1A and FIG. 1B, the connector body 13 is reinforced in the region of the first opening 21 and in the region of the second opening 23 by it in each case taking on a somewhat larger thickness over a substantial region. In the present case, this is realized in particular by the second opening 23 having a threaded collar 43 which, in this case, faces the groove base 9. Similarly, the first opening 21 is reinforced in its side 45 facing the undercut 5 by means of a step-like thickened portion. In a modification thereto, a collar could also be integrally formed on the first opening 21 on the connector body 13 in addition to or as an alternative to the step.

Further reinforcements (not shown here) can be provided in embodiments in which the thickness D of the connector 11 could prove too little to withstand stressing during the formation of the profile assembly 10. Thus, in other embodiments (not shown), in addition or as an alternative, one or more stiffening ribs running in particular along an elongate extent, and/or one or more, in particular lateral, webs running in particular along an elongate extent, can be provided. In the case of a punched and/or bent part in the form of sheet metal—as in the case of the present connector body 13—such webs can preferably be formed as bent-up webs. As an addition or as an alternative, one or more beads or elongate knobs may be pressed into the connector body 13.

In the case of further variants (not shown here) of the embodiment according to FIG. 1, FIG. 1A and FIG. 1B, the thread axis 47 in the second opening 23 can also run obliquely with respect to a perpendicular to the connector body plane 15. This increases the handling comfort when tightening the fastening screw 17, since a hexagon key web in the hexagon key pin can more easily be inserted into the hexagon socket cup 33. An obliquely positioned thread axis for the fastening screw 17 would advantageously also increase the fixing region of the fastening screw 17 in the groove of the perpendicular profile 2. In addition, such a tilting connector would be more universally usable.

In the case of the embodiment illustrated in FIG. 1, FIG. 1A and FIG. 1B, the fastening screw can be rotated in the normal direction of rotation by fitting a hexagon key in the hexagon socket cup 33. For this purpose, in the present case, the internal thread 41 of the connector body 13 is designed as a left-handed thread with the external thread 25 of the stem 27. In the embodiment illustrated in FIG. 1, FIG. 1A and FIG. 1B, the threads 41, 25 are designed as fine pitch threads with a pitch of 0.75 mm per turn, instead of normally with a pitch of 1.25 mm per turn. As a result, the fastening screw 17 can be tightened in a particularly smooth-running manner, with the connector body 11 being pressed by means of its side 53 opposite a tilting edge 51 away from the undercut 5 toward the interior 9 of the groove in accordance with the arrow depiction 49 in FIG. 1. By means of the tilting 49, tension is exerted on the anchoring screw 19 which—owing to being fixed in the receiving opening 35 of the upright second profile 2—pulls the second profile 2 onto that surface of the first profile 1 which is formed by the profile web 3, and fixes it there.

The tilting connector shown in FIG. 1 is part of a connector system shown in FIG. 1A and FIG. 1B, which part can be produced particularly easily and nevertheless ensures a secure profile assembly 10. In order to place the connector 11 into the groove 7, there is a slight degree of play between the connector body 13 and the profile web 3 so that the connector 11 can be pushed in and the described lever effect between the tilting edge 51 and that part 53 of the connector body 13 which executes the tilting movement 49 can come into action.

Figure 2:
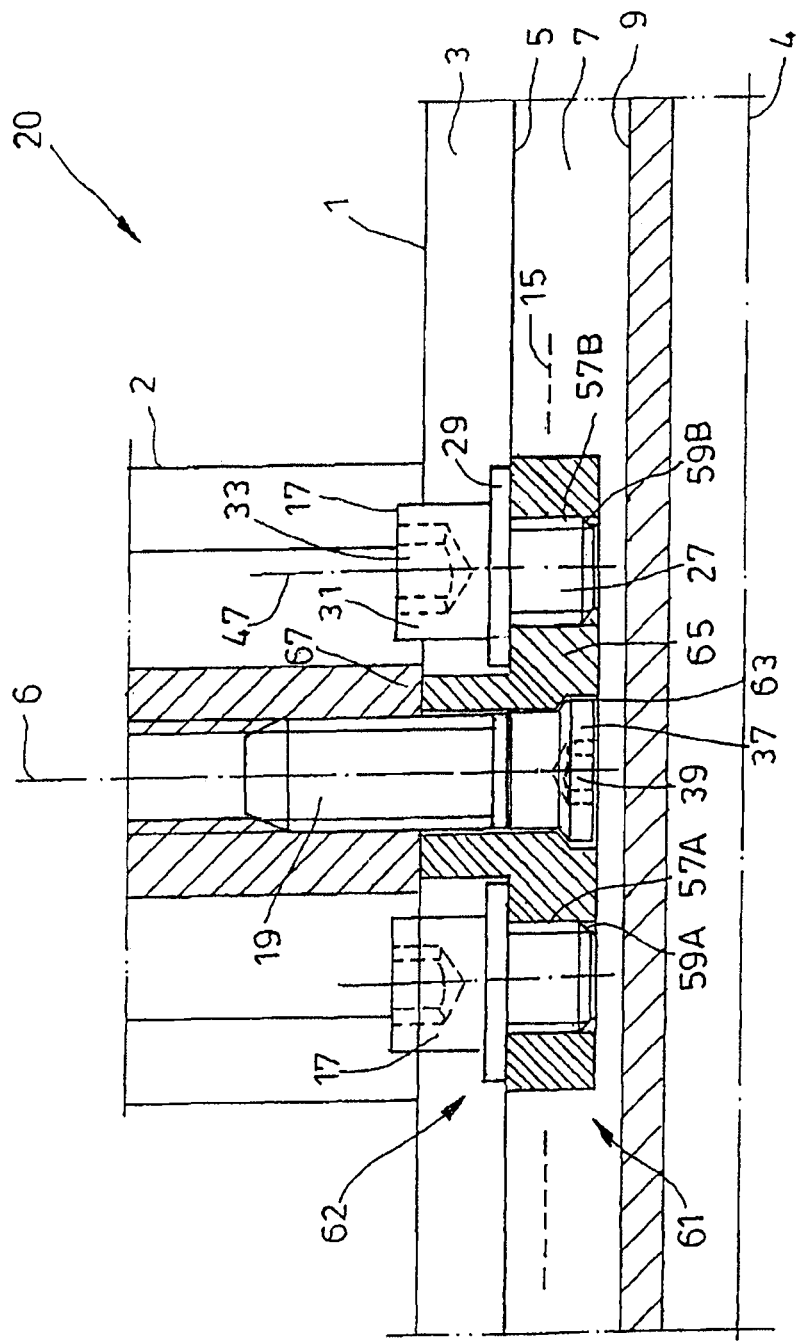
FIG. 2 shows a sectional illustration of a profile assembly with a connector system according to an embodiment according to the third variant of the invention.

FIG. 2 shows a further preferred embodiment of a connector system in a profile assembly 20 in comparison to FIG. 1. In the present case, the connector system has a connector 61 which has precisely two second openings 59A, 59B provided with an internal thread 57A, 57B. A respective fastening screw 17, as has already been described with respect to FIG. 1, engages in said openings. The same reference numbers are accordingly provided. In the present case, the first opening 63 is arranged centrally between the second openings 59A, 59B and in turn receives an anchoring screw 19 which has already been described with respect to FIG. 1—and, in turn, the same reference numbers are provided for the anchoring screw 19. In the present case, the connector body 65 of the connector 61 has, in the region of the first opening 63, a means for securing against rotation—in the present case in the form of an angular elevation which forms the opening delimitation of the first opening 63 and via which the connector 61 can be fixed in the mutually facing end sides of the profile webs 3 at the narrowing of the groove. In addition, it is advantageous that, if the connector is preinstalled over the opening delimitation, a distance of the flat regions from the perpendicular profile 2 and therefore from an inner side of an undercut of the horizontal profile 1 is predefined.

When the two fastening screws 17 are tightened, the anchoring screw 19 is subjected on both sides to a tensile load via the connector 61 in the form of a tensile connector. The anchoring screw 19 is pulled into the groove 7 and, as a result, the perpendicular, second profile 2 is fixed to the first profile 1.

FIG. 3A and FIG. 3B show a further embodiment of a connector system 72 in which the fastening screw 18 acts as a lever screw and the connector 61 acts as a tilting connector with a tilting edge 51' on the far side of the first opening 21'—in a very similar manner to that shown in FIG. 1. Accordingly, the same reference numbers have been provided for mutually corresponding parts of the figure.

In contrast to the connector 11 shown in FIG. 1, the connector 71 of FIG. 3A, FIG. 3B is provided with a first opening 21', which is in the form of a slot of the connector body 73, which slot runs in the longitudinal direction of the connector body 73 and is delimited by fork-like arms 75. In the present case, the fork-like arms 75 have an end-side widened portion 77 which runs transversely with respect to the longitudinal direction of the connector body and serves to extend a tilting edge 51' and therefore to improve the tilting behavior of the connector 71. As a result, the tilting connector is also stabilized in its position. The widened portion 77 may, if appropriate, also be designed in such a manner that it counteracts an expansion of the fork-like arms 75 by bearing on an outer side against an inner side of the groove.

The fastening screw 18 provided for this purpose again has a flange 28 which, in the present case, has two opposite interruptions 26 along its circumference, with, in the region of said interruption, the screw head being the same size as the hexagon socket insert cup. In a particularly preferred manner, the flange 28 in the present case has a ramp 24 provided with a slope. The ramp 24 can be provided on its upper side with a structure, for example with a ribbing or with latching teeth, which counteracts a release of the screw. In the present case, the slope of the ramp 24 is such that, upon a quarter turn of the fastening screw 18, a profile assembly is closed such that the present case involves a ramp 24 with a quarter turn slope. This measure advantageously ensures that, above a quarter turn, over-rotation of the fastening screw 18 and therefore slipping of the fastening screw 18 out of a groove 7 are avoided. For this purpose, a ramp can advantageously have, at its upper end, an additional raised portion acting as a stop. In principle, a fastening screw with a ramp, for example the fastening screw 18 or a modification thereof, for example modified in relation to the interruptions 26 or the slope of the ramp 24, can be used in all of the above-mentioned embodiments of a connector 11, 61, 71.

The connector 71 according to FIG. 3A, FIG. 3B can be used in a particularly simple manner in order to connect a second profile 2 retrospectively to a first profile 1—i.e. between two perpendicular profiles which are already present. For this purpose, the second profile 2 is placed onto the first profile 1 by means of an anchoring screw 19 such that the anchoring screw projects into the groove 7 of the first profile 1. The connector 71 is subsequently pushed laterally into the groove and such that it engages with its fork-like arms in the narrowing and around the anchoring screw 19 between the countersunk screw head 37 and the thread M8. The connector system can subsequently be tightened, as already described with reference to FIG. 1, FIG. 1A and FIG. 1B in order to connect the first profile 1 and the second profile 2 to each other.

In summary, a connector 11, 61, 71 is provided for fixing in a groove 7 of a first profile 1, which groove is provided with an undercut 5 formed by a profile web 3, with a connector body 13, 65, 75 which has: a first opening 21, 63, 21' for an anchoring screw 19 and at least one second opening 23, 23', 59A, 59B provided with an internal thread 41, 57A, 57B and intended for a fastening screw 17, 18. According to the concept of the invention, the connector body 13, 65, 75 extends substantially flat along a connector body plane 15. The maximum thickness D of the connector body 13, 65, 75, taken on in particular over a substantial region, preferably amounts to no more than 20% of a longitudinal extent L of the connector body 13, 65, 75. This has the advantage that the connector body 13, 65, 75 can be in the form of a sheet-metal part and/or a punched and/or bent part. A fastening screw 17, 18 provided for forming a connector system at one end has a stem 27 bearing an external thread 25. According to the invention, a flange 29 is integrally formed, said flange extending radially outward from a screw head 31. The flange 29 is supported against the profile web 3 of the first profile 1 upon rotation of the fastening screw 17, 18 in the internal thread 41 of the connector 11, 61, 71. According to the concept of the invention, the connector system 11, 61, 71 additionally provides an anchoring screw 19. According to a first variant of the invention, the connector 11 is designed as a tilting connector, with the first opening being in the form of a thread-free screw hole. According to a second variant of the invention, the connector 71 is formed as a tilting connector, with the first opening 21 being in the form of a slot of the connector body 73, which slot runs in the longitudinal direction of the connector body and is delimited by fork-like arms 75. According to a third variant of the invention, the connector 61 is designed as a tensile connector.

The invention claimed is:

1. A connector assembly, comprising
   a first profile member and a second profile member each having an undercut;
   a fastening screw (17, 18);
   an anchoring screw (19);
   a connector comprising a connector body (13, 65, 75) having a first opening (21, 63, 31') for the anchoring screw (19) and a second opening (23, 23', 59A, 59B) having an internal thread (41) for the fastening screw (17, 18);
   the anchoring screw (19) extending through the first opening (21, 63, 31') into engagement with the first profile member;
   the fastening screw (17, 18) having a stem (27) bearing an external thread (25) engaged with the internal thread (41) of the second opening (23), and having a screw head (31) and an integrally formed flange (28, 29) which extends radially outward from the screw head, the flange (28, 29) engaging the undercut (5) of the second profile member;
   whereby rotation of the fastening screw (17, 18) relative to the threaded opening (41) causes the fastening screw (17, 18) to act as a lever screw, and the connector (11, 71) acts as a tilting connector with a tilting edge (51, 51') on a far side of the first opening (21, 21'), and rotation of the fastening screw (17, 18) results in the connector body being pushed on the side opposite the tilting edge into the interior of the groove while the tilting edge bears against that surface of the undercut which faces the interior of the groove.

2. The connector assembly (12, 72) as claimed in claim 1, wherein a maximum thickness (D) of the connector body (13, 65) amounts to no more than 20% of a longitudinal extent of the connector body (13, 65).

3. The connector assembly (12, 72) as claimed in claim 1, wherein the connector body (13, 65) is reinforced at least in the region of the first opening (21, 63).

4. The connector system (12, 72) as claimed in claim 3, wherein the reinforcement is in the form of at least one of (a) an increase in thickness (D) of the connector body (13, 65), (b) the connector body (13, 65) has one or more stiffening ribs running along an elongate extent, and (c) the connector body (13, 65) has one or more webs running along an elongate extent.

5. The connector assembly (12, 72) as claimed in claim 1, wherein the connector body (13, 65) is one of a sheet-metal part, punched part and a bent part.

6. The connector assembly (12, 72) as claimed in claim 1, wherein the second opening (23, 59A, 59B) has a threaded collar (43) which faces the profile web.

7. The connector system (12, 72) as claimed in claim 6, including an internal thread having a thread axis (47) in the second opening (23, 59A, 59B) which runs obliquely with respect to a perpendicular to the connector body plane (15).

8. The connector system (12, 72) as claimed in claim 7, wherein the internal thread (41, 57A, 57B) is a left-handed thread.

9. The connector system (12, 72) as claimed in claim 7, wherein the internal thread (41, 57A, 57B) is a fine pitch thread.

10. The connector assembly (12, 72) as claimed in claim 1, wherein the connector body (13, 65) has, in the region of the first opening (21, 63), a device to secure the connector body (13, 65) against rotation.

11. The connector system (12, 72) as claimed in claim 10, wherein the device to secure against rotation comprises an opening delimitation which is formed as an angular elevation for fixing the connector body (13, 65) to the profile web (3) in a manner secured against rotation.

12. The connector system (12, 72) as claimed in claim 11, wherein the first opening (21, 63) is in the form of a thread-free screw hole.

13. The connector assembly (12, 72) as claimed in claim 1, wherein the flange (28, 29) of the fastening screw (17, 18) is arranged between the screw head (31) and stem (27).

14. The connector system (12, 72) as claimed in claim 13, wherein the screw head (31) of the fastening screw (17) has a hexagon socket insert cup (33) or a hexalobular internal insert cup.

15. The connector system (12, 72) as claimed in claim 13, wherein the flange (28, 29) of the fastening screw (18) has at least one interruption (26) along its circumference.

16. The connector system (12, 72) as 1 claimed in claim 15, wherein the screw head (31) of the fastening screw (18) has the radial dimensions of a hexagon socket insert cup (33) in the region of the interruption (26).

17. The connector assembly (12, 72) as claimed in claim 1, wherein the flange (28) of the fastening screw (18) has a ramp (24) with a quarter turn slope.

18. The connector assembly (12, 72) as claimed in claim 1, wherein the first opening (21, 21', 63) is in the form of a thread-free screw hole.

19. The connector assembly (12, 72) as claimed in claim 1, wherein the first opening (21') is in the form of a slot of the connector body (73), which slot runs in a longitudinal direction of the connector body (73) and is delimited by fork-like arms (75).

20. The connector assembly (12, 72) as claimed in claim 1, wherein axes of the first opening and the second opening are substantially parallel.

21. The connector assembly of claim 1, wherein axes of the first opening and the second opening are substantially parallel.

22. The connector assembly of claim 1, wherein the connector body has a length (L) and a width, wherein the length is greater than the width and wherein the width is greater than the undercut so that the tilting edge (51, 51') engages the undercut (5) of the second profile member.

* * * * *